March 14, 1967  W. T. ILLINGWORTH ET AL  3,308,699
SHEARING AND EXTRACTOR DEVICE
Filed May 28, 1964  4 Sheets-Sheet 4

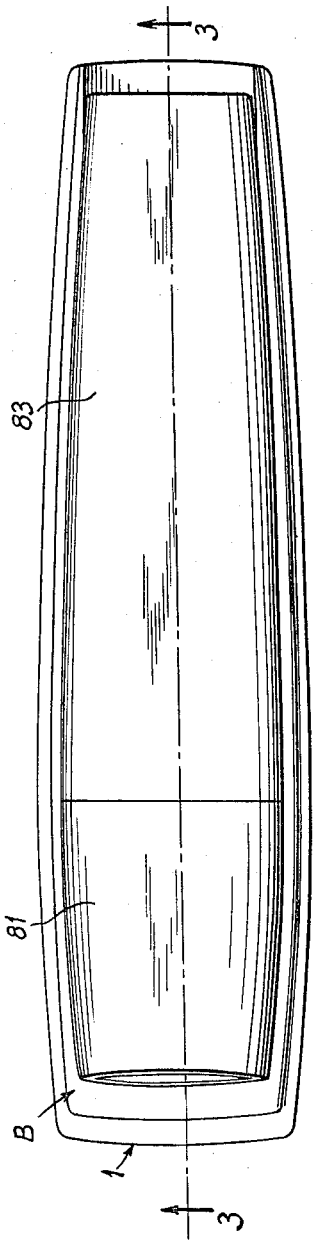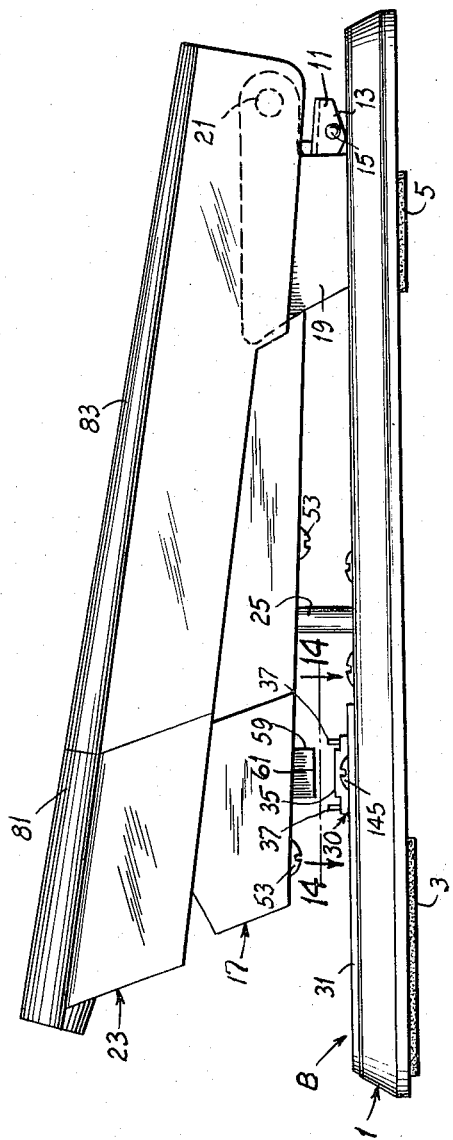

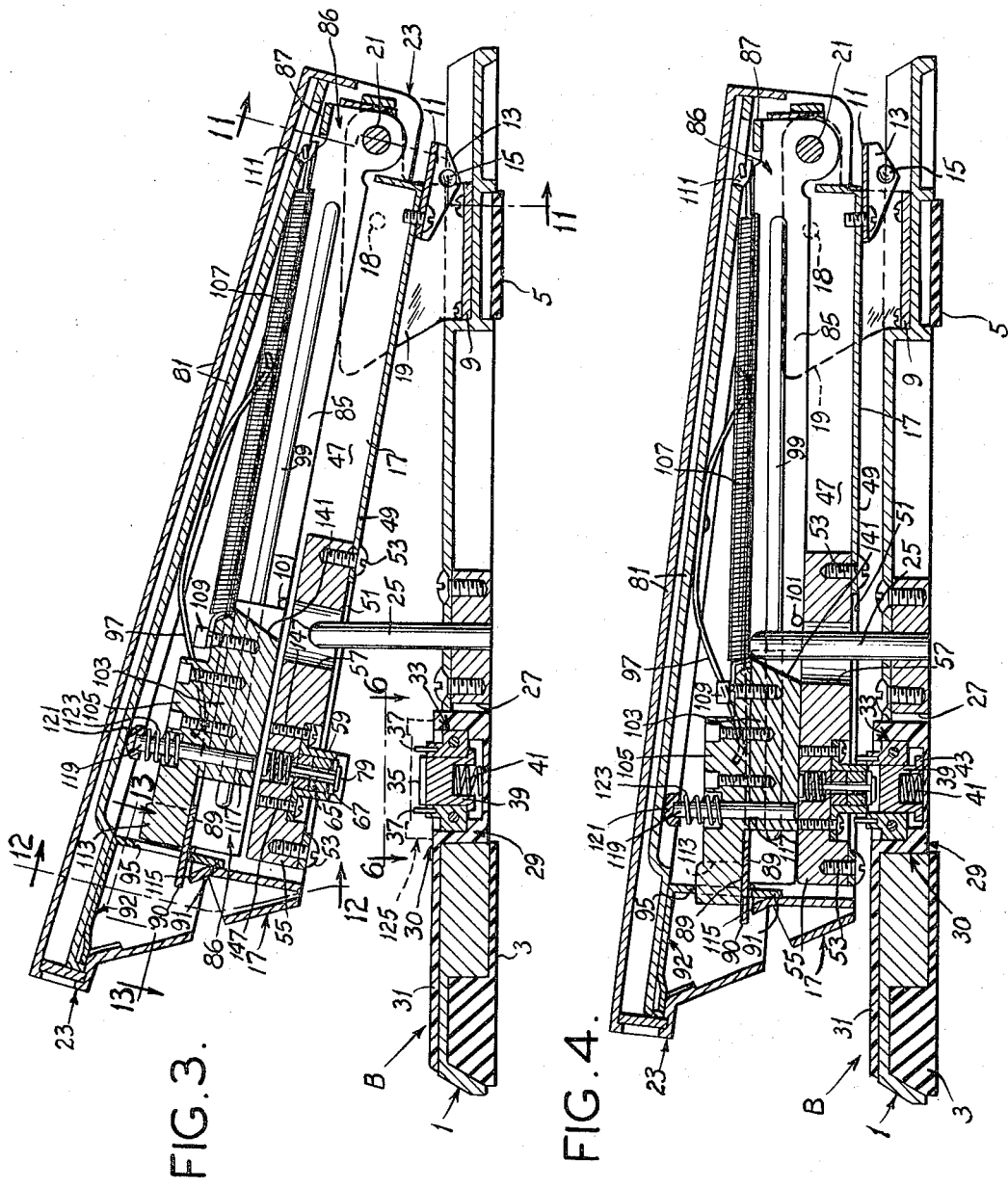

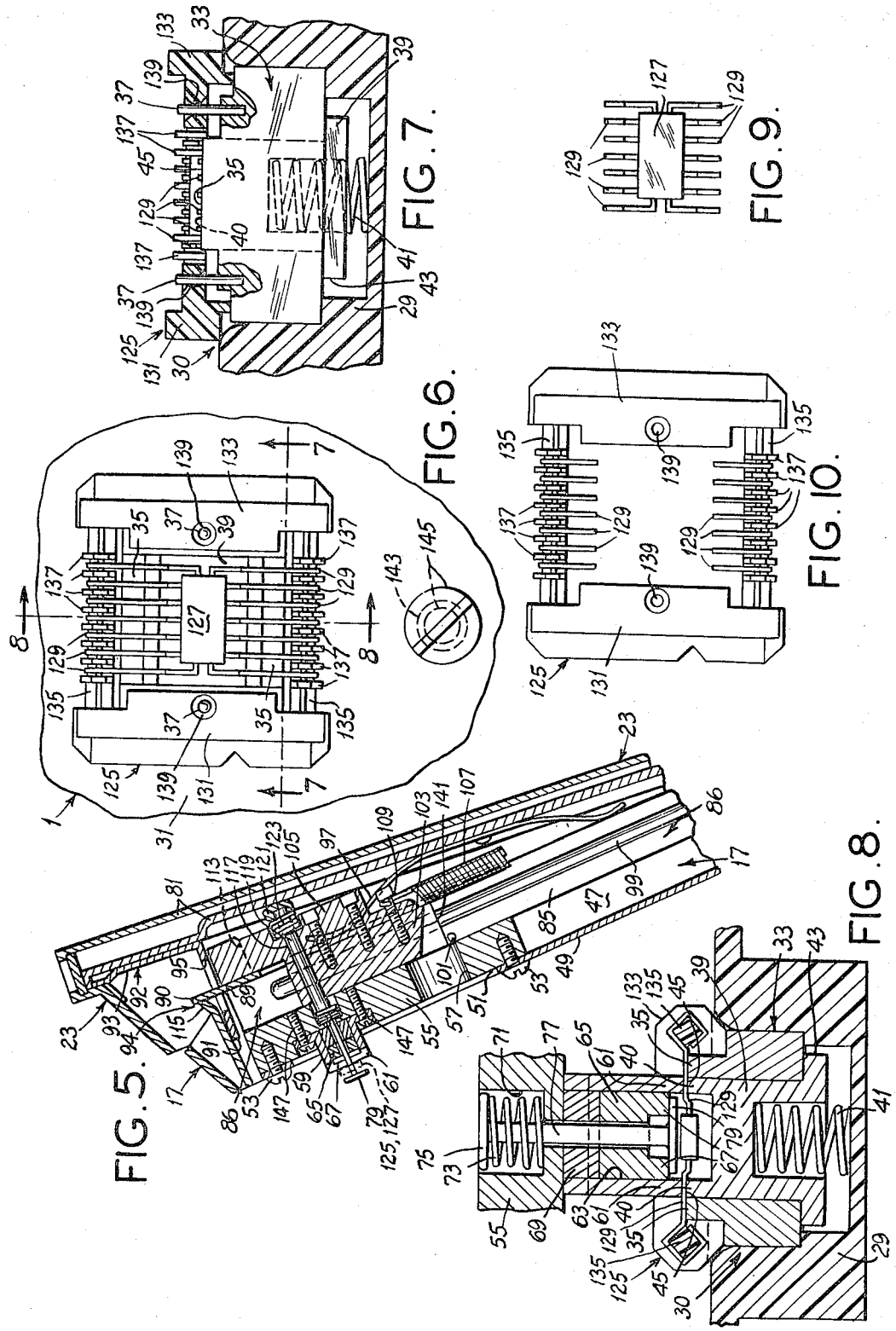

United States Patent Office 3,308,699
Patented Mar. 14, 1967

3,308,699
SHEARING AND EXTRACTOR DEVICE
William Thomas Illingworth and David John Howard, both of Houston, Tex., assignors to Texas Instruments Incorporated, Dallas, Tex., a corporation of Delaware
Filed May 28, 1964, Ser. No. 371,889
20 Claims. (Cl. 83—133)

This invention relates to shearing and extractor devices, and with regard to certain more specific features, to such devices for shearing and extracting from supporting fixtures devices such as delicate microminiature solid-circuit semiconductor networks or the like.

Among the several objects of the invention may be noted the provision of a portable, manually operable device of the class described which will progressively, rather than simultaneously, shear network leads, so as to minimize upsetting forces on the leads; the provision of a device of this class which while manually operable permits of stripping and ejection of the sheared networks from the device without manual handling of or damage to the networks; and the provision of a device of the class described having interchangeable easily sharpened dies readily insertable and adjustable for use. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is a top plan view of the entire device;

FIG. 2 is a front elevation of FIG. 1;

FIG. 3 is a longitudinal section taken on line 3—3 of FIG. 1, the device being shown in an open position and showing in phantom the location of a carrier for an object to be sheared;

FIG. 4 is a view similar to FIG. 3, showing the device in closed position for effecting initial die adjustment;

FIG. 5 is a fragmentary view showing certain parts in ejecting positions;

FIG. 6 is an enlarged plan view taken on line 6—6 of FIG. 3, showing in solid lines the object to be sheared and its carrier, said carrier being the one shown in phantom in FIG. 3;

FIG. 7 is a vertical section taken on line 7—7 of FIG. 6;

FIG. 8 is a cross section taken on line 8—8 of FIG. 6, having added thereto a shear punch in position ready for shearing;

FIG. 9 is an enlarged plan view of a sheared-out network;

FIG. 10 is an enlarged plan view of the carrier from which the network of FIG. 9 has been sheared out;

Figure 11:
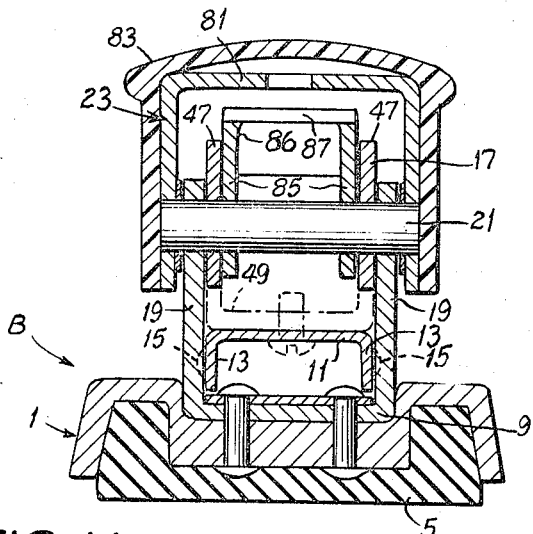
Figure 12:
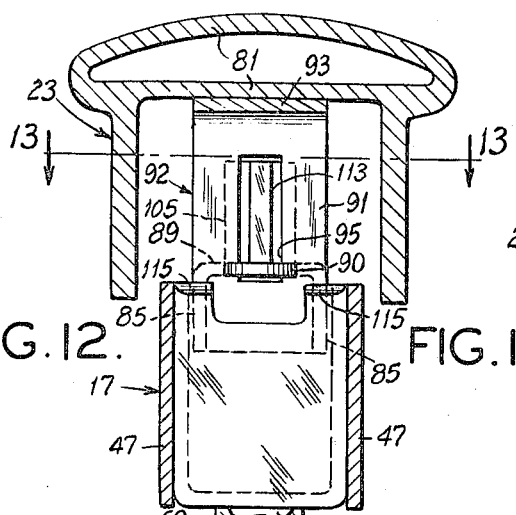
Figure 13:
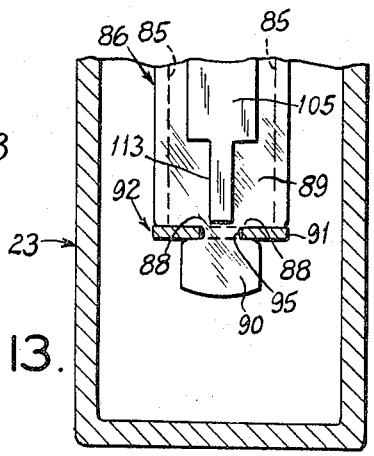
Figure 14:
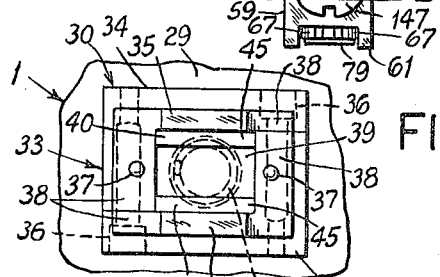

FIGS. 11, 12 and 13 are enlarged fragmentary cross sections taken on lines 11—11, 12—12 and 13—13, respectively, of FIG. 3, illustrating certain structural details;

FIG. 14 is an enlarged cross section taken on line 14—14 of FIG. 2; and

Figure 15:
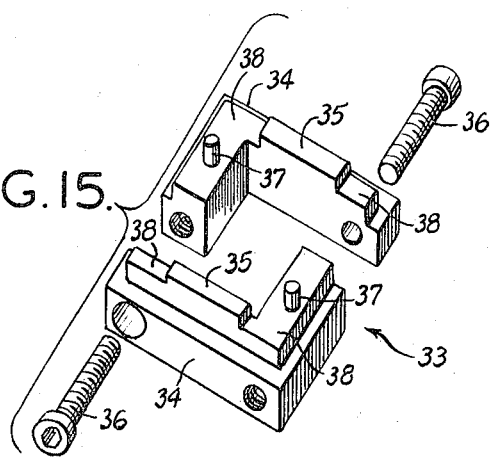

FIG. 15 is an exploded perspective view of certain cutting bars illustrated in FIG. 14.

Corresponding reference characters indicate corresponding parts throughout the several views of the drawings.

It will be understood that the drawings are illustrative, rather than to exact scale.

Microminiature solid-circuit semiconductor networks and the like have small conductive leads which before assembly into circuits are extremely delicate. It is necessary, however, that their locations in a plane or other chosen arrangement should be preserved throughout manufacture. Consequently, it has been the practice to mount them early in the manufacturing process upon carriers from which their essential portions are at some stage sheared out, preparatory to subsequent assemblies to form circuits. Devices have been proposed to perform the shearing and extraction operations but these have had the disadvantage (which the present invention avoids) that all of the leads have been simultaneously sheared by straight-line punching which caused undesirable upsetting forces on the network leads with attendant distortions. These former devices also had the disadvantage that the required manual or other handling of them for removal from the shearing device deformed the delicate leads. They were also difficult to align and maintain in sharp condition for close shearing tolerances. All of these disadvantages are avoided or at least mitigated by means of the present invention.

Referring now more particularly to the drawings, there is shown at B a base assembly (FIGS. 1–4). This assembly B includes a platen 1 to which are attached rubber or like frictional supporting pads 3 and 5. Attached to the platen 1 above pad 5 is a plate 9 having sidewise extensions 19, the latter carrying a crosspin 21 for pivoting an inner lever 17. Lever 17 at its rear end carries U-shaped detent member 11 (FIGS. 2–4 and 11). Springy legs 13 of member 11 are dimpled at 15 for frictional engagement inside of the extensions 19 and eventual detaining cooperation with holes 18 in the latter. Thus lever 17 may be rotated clockwise from positions such as shown in FIGS. 3 and 4 to a detained angular more open position relative to platen 1. The detained position of lever 17 is as shown in FIG. 5.

A second outer lever 23 is also pivoted on the pin 21. Thus the levers 17 and 23 may be swung together relative to the base assembly B and also with respect to one another, as will appear. Between the first and second levers 17 and 23 is located a third intermediate lever 86, primarily constituted by two bars 85 also pivoted on the pin 21. This intermediate lever 86 is swingable with and relative to the outer and inner levers 23 and 17, as will appear. Detention of lever 17 detains all of them as shown in FIG. 5. Further details regarding the three levers appear below.

Attached to and extending upward from a central portion of the platen 1 of base B is a camming pin 25. An opening 27 is provided toward the front of the platen 1 for the reception of die nest part 29. The die nest as a whole is lettered 30. The die nest also includes an extension 31 supported on the front of platen 1. The nest 30 is held in place on platen 1 by two screws 145 flanking part 29. The screws 145 are threaded into the platen through openings such as shown at 143 in the tongue part 31. These openings are slightly larger than the screws so that the die nest may be adjusted in proper position on platen 1 prior to tightening the screws. While only one screw 145 and its opening 143 appear in FIGS. 2 and 6, it will be understood that there is another of each on the opposite side of the die nest part 29. A greater number may be employed, if desired.

The die nest 30 is preferably composed of a somewhat flexible plastic material for frictionally holding in its socket-forming part 29 a die frame 33 having on two sides opposite parallel sidewise cutting bars 35. On the other two opposite sides are registration pins 37. Further particulars are given below for frame 33. Within the frame 33 is movably carried a rocking pressure member 39 which is biased upward from the bottom of the socket part 29 of the die nest 30 by a spring 41. Rocking is provided for by suitable play in the fit between parts 39 and 33. An upward limiting position of the member 39 is determined by contact between a bottom flange 43 thereon with the bottom of the die frame 33. The rocking member 39 is U-shaped in cross section, as shown in FIG. 8. The ends 40 of the legs of the U-shape, as shown in FIG. 6, form longitudinal pressure pads 45. Each pad 45 in the upwardly biased position of the pressure pad 39 is flush with the top of the adjacent cutting bar 35. The outsides of the legs of the U-shaped pressure pad 39 lie along the insides of the cutting bars 35.

Referring again to the lower lever 17, it is channel shaped, having identical sides, one of which is shown at 47 in FIG. 3, and a bottom 49, in which is an opening 51. Attached to the bottom 49 of the channel (by screws 53) and overlying the opening 51 is an affixed punch-supporting block 55. The block 55 contains an opening 57 through which the camming pin 25 moves relatively when the lever 17 is swung toward the base assembly B. The block 55 supports a shear punch 59, screws 147 forming an attachment. The shear punch has rectangular cutting bars 61, shaped to fit (during shearing) between the cutting bars 35 and to overlie the pressure pads 45. The outside faces of the cutting bars 61 are designed to fit flatly within the insides of the faces of the cutting bars 35, so as to provide shearing action therewith when the cutting bars 61 are angularly translated to the pressure pads 45. Scissor-like shearing action, due to rotation of lever 17, advances from right to left as the device is actuated from the FIG. 3 to the FIG. 4 position.

A circular opening 63 extends through the shear punch 59 for the reception of a circular magnet 65 having magnetic poles 67 and a backing brass washer 69. These have a frictional fit in the opening 63. A counterbored opening 71 in the block 55 contains a spring 73 which seats on the shoulder of the counterbore. The spring 73 presses upwardly on one head 75 of an ejector pin 77. On the other end of the pin 77 is located a second nonmagnetic head 79 which is normally pulled up against the magnetic poles 67 by action of the spring 73. Thus the magnet 65 and washer are held in place by head 79 when, as may be, the punch 59 for reshapening is removed from member 55 by removal of screws 147. Since the bars 61 extend into the clear from the punch 59, they may readily be sharpened by grinding. The said friction fit prevents the magnet 65 from following the head 79 when the latter is moved down by pressing on the head 75.

Referring to the outer lever 23, it is constructed with an inner metal top 81 over which is attached a plastic cover 83. As above noted, there is pivoted on pin 21 and under the top 81 the duplicate side bars (one of which is shown at 85) which mainly form the lever 86. The bars 85 are connected by a crosspiece 87 above the pin 21. They are connected at their other ends by a notched crosspiece 89. The notches are shown at 88 (FIG. 13). The crosspiece extends through a vertical slot 95 in one leg 91 of an L-shaped spring member 92. The crosspiece 89 is thus headed, as shown at 90, beyond notches 88 and slot 95.

The other leg 93 of spring 82 is riveted to the metal top 81. Thus the connected side bars 85 form the lever 86, pivoted at 21 for angular movement relative to lever 23. Limited sliding action of the headed extension 89 up and down in the slot 95 permits this. At 97 are shown leaf springs riveted to the top 81 and extending into pressure engagement with the bars 85 to bias them in an anticlockwise direction away from lever 23. Separating movement is limited by engagement of extension 89 with the lower end of the slot 95. The resulting relative limiting positions are shown in FIG. 3.

Each bar 85 is provided with a guide-forming ridge 99. At 101 is a crosswise stop pin. Slidable on the guides 99 is a carriage 103 to which is attached an extension 105. A tension spring 107 is anchored at one end to the assembly 103, 105 (see anchor 109) and at the other end to the top 81 (see anchor 111). The forward end of the extension 105 has a reduced portion 113 which also may enter slot 95, as shown in FIG. 4, or be retracted therefrom (FIG. 3). It is also retracted therefrom as shown in FIG. 5. The spring leg 91 is adapted for frictional latching engagement with an upstanding latch portion 115 of the lever 17.

A hole 117 through the connected carriage parts 103, 105 accommodates a drive pin 119 on which is a head 121 engageable with the top 81 of lever 23. A compression spring 123, reacted between the member 105 and head 121, pushes head 121 against the top 81, while drawing the drive pin 119 back into the opening 117. As shown in FIG. 3, the hole 117 is so positioned that when the carriage 103 is pulled by spring 107 against the stop pin 101, the drive pin 119 is in substantial alignment with the ejector pin 77.

Referring to FIGS. 6–10, there is shown at numeral 125 a carrying fixture such as disclosed in the copending patent application of Arnold W. Walkow, Ser. No. 302,195, filed Aug. 14, 1963, for Carrier. This has eventuated as U.S. Patent 3,267,335. At numeral 127 is shown an example of a device to be carried. This is a semiconductor element having a plurality of delicate conductive leads 129. The carrier is formed as a frame having end members 131, 133, joined by side bars 135. Partitioning flanges shown at 137 provide spaces for attachment of the ends of the leads 129, which are wrapped around the side bars 135. Holes 139 in the end members 131 serve with the registration pins 37 to place the carrier with the electronic device 127 and its leads 129 in proper registration on the cutting bars 35 and pressure pads 45 while maintaining the leads 129 in a proper common plane. This is illustrated in FIGS. 6 and 7.

When the lever 17 is swung down, the shear punch 59 swings down in an arc. This angularly moves its cutting bars 61 in between the cutting bars 35 of the die parts. In doing so, the cutting bars 61 register with the pressure pads 45 as the bars 61 angularly approach the leads 129. Since the cutting bars approach the die nest at an angle, they first engage a lead 129 near the ends of the cutting bars 35 and pressure pad 45 which are nearest pivot pin 21. This rocks down the adjacent end supports of the pressure pad 45, shearing off the first endwise lead 129. With further movement, one lead after another (proceeding from right to left in FIG. 6, for example) is sheared while the pressure pad 39 moves down angularly, following with its rocking movement the angle of movement of the shear punch 59. The result is that the device 127 is cut away from its carrying fixture 125 (FIG. 9). The device 127 carries with its appropriate length of its leads 129, the remaining waste portions of said leads remaining with the carrier 125 (FIG. 10).

It will be understood that the pressure pad 39 has a loose enough fit in the die frame 33 to permit it to rock in the plane of the paper (FIGS. 3 and 4), thus to follow the angular movement of the shear punch 59. The necessary front and back clearance is small and on the scale of the drawings does not show in FIGS. 3 and 4. It will be understood, however, that it is definitely provided for. The resulting successive scissor-like shearing actions on the leads 129 in sequence are advantageous in improving the effects of the shearing forces on the network leads 129, whereby minimum upsetting forces occur on the leads 129. In this respect the device is advantageous over devices having parallel movements between their dies and punches.

Further advantages of the device will appear from the following general description of operation:

Assume first, as shown in FIG. 6, that a carrier 125 with its attached network 127, 129 is placed so that the holes 139 register on the pins 137. In FIG. 3 the carrier is shown in phantom. Because it would complicate FIG. 4, the carrier is not shown in position on the die frame 33. Moreover, FIG. 4 illustrates conditions for die adjustment in the absence of a carrier. In any event, there is enough frictional latching effect between leg 17 and the part 86 to hold together the levers 17 and 86 in the FIG. 3 position. Then as these levers 17, 23 and 86 are swung anticlockwise (FIG. 3 and FIG. 4), a cam portion 141 on the slider 103 is engaged by the pin 25. This moves the slider from the position shown in FIG. 3 to that shown in FIG. 4. Sliding occurs on and between the bars 85 forming the intermediate lever 86. As a result, the left-hand end of the member 105 on the slider 103 enters the slot 95. This locks the levers 86 and 23 as a driving unit with the pin 119 out of registry with the ejector pin 77, as shown in FIG. 4. As this driving unit (interlocked levers 23 and 86) is pushed down, member 103 on lever 86 presses on member 55 on lever 17. As a result, the cutting bars 61 of the shear punch 59 on lever 17 touch the first lead 129 to be cut at the die. Further pressure then forces completion of the sequential scissor-type angular shearing action on leads 129.

After the shearing action has been completed, the levers 23, 86 and 17 are manually swung clockwise. The frictional latching effect between parts 23 and 86 prevents lever 17 from being left behind. The magnet 65 has attracted the sheared-out device 127, 129 in its FIG. 9 condition, and as shown in phantom on FIG. 5. At this time, the end portion 113 of member 105 has been retracted from the slot 95 because the slider 103 has been drawn back by the tension spring 107. The operator, without touching the sheared-out assembly 127, 129, places a hand around levers 23 and 17 and by a squeezing action (FIG. 5) causes these to approach one another. The frictional contact at 23, 86 permits this. Lever 17 drives lever 86 toward lever 23 by contact at 94 (FIG. 5). This occurs against the action of leaf springs 97 on bars 85. The draw-back of slider 103 has registered drive pin 119 with the ejector pin 77, so that upon the stated squeezing action the head 79 of the ejector pin 77 is pushed out from the shear punch 59 to remove the finished assembly 127, 129 from the face of the magnet for dropping into a suitable receptacle, without having been touched manually. During the squeezing action, the springs 97 have been compressed. Upon release of the squeezing action, the springs 97 return the levers 23 and 17 to their initial positions shown in FIG. 3, ready for a subsequent repetitious operation after removal of the parts shown in FIG. 10 from the die frame 33.

It will be understood that the adjacent sides and faces of the cutter bars 35 and 61 should be precision-machine hardened and ground to facilitate close shearing action with minimum force and maximum accuracy. To facilitate machining, the die frame 33 is formed of two abutting identical L-shaped pieces 34 as shown in FIG. 15, adapted to be held together by Allen-head countersunk screws 36. Surfaces 38 on these are coplanar for supporting the carrying frames or fixtures 125. Pins 37 are inserted into openings in these surfaces. Upstanding from these surfaces are the integrally formed cutting bars 35. These integral bars 35 are thus in the clear for convenient sharpening by surface grinding when the pieces 34 are demounted. If the die frame 33 were to be made as a one-piece frame, comparatively unsatisfactory broaching would be required for renewing the inner surfaces of bars 35. By use of the two-piece L-shaped elements 34, permitting accurate sharpening with resulting high efficiency of shearing action to be maintained, low operating forces are preserved with minimum upsetting, flaring, pulling and other undesirable network lead conditions.

It is apparent that the assembled die frame 33 must be accurately located for the accurate reception of the cutter bars 61 between the cutter bars 35. Registration of these accurately constructed parts may be initially accomplished by properly placing the die nest member 29 in the opening 27. The nest also has the tongue 31 which overlies the platen 1. As above stated, oversize holes are made in this tongue part for loosely accepting screws threaded into the platen 1. Thus by loosening screws such as 145 and adjusting the position of the die nest 30 by manual manipulation of the tongue 31 at a time when the cutting bars 61 are brought down into position as shown in FIG. 4, registration may be obtained between the lower die and interfitting upper punch parts. Then the screws 145 are tightened and thereafter proper registering thus obtained between the accurately formed shear parts will be maintained.

The use of the die nest 30 as above described also permits of conveniently interchanging die sizes either by placing a new die frame 33 in the die nest 30 or replacing the entire assembly of die nest 30, tongue 31 and new die frame 33 in connection with the platen 1. Such interchange also requires interchangeability of the shear punch assembly. This is readily accomplished by removing the member 55 and replacing the shear punch assembly therein by another of appropriate size. As will be seen from FIGS. 3 and 4, any shear punch 59 may be removed from and replaced by removing screws 147.

It will be understood that although the invention has been described for shearing action in connection with a frame-mounted semiconductor network unit, it is useful for shearing other small parts presenting similar problems.

There are several advantages of the invention, among which are the following:

(1) Minimal upsetting or distorting forces are applied to network leads and the like in shearing and extracting them from their carriers;

(2) Removal of sheared networks from the shearing tool is accomplished without manual handling of them;

(3) The matching identical two-piece shear-punch parts are adapted for precision manufacture and resharpening;

(4) Interchangeable die and shear-punch assemblies permit various network lead sizes to be sheared;

(5) Replaceable die nests provide convenient interchange of die sizes and adjustment thereof into initial position;

(6) Portability and ease of operation of the entire shearing tool are provided.

In the following claims, the levers 17, 23 and 86 are for identification sometimes referred to as first, second and third levers, respectively. It will be observed that the detent device between levers 17 and 23 allows retraction of lever 17 from the lever 86, primarily to permit inspection of interior parts when desired. If provision for such inspection is not desired, then levers 17 and 86 may be connected permanently to swing together as what may be referred to as a first swingable assembly relative to lever 23, which may be referred to as a second swingable assembly, without changing the principles of operation, except for separability for inspection. Thus in effect levers 17 and 86 constitute one swingable operating assembly on the base and lever 23 another relatively swingable operative assembly on the same base. The pin 25 on the base is then simply means for positioning parts in the first assembly 17, 23 so that they may be operated upon in one way or another by the second swingable assembly 23.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for shearing devices from supporting means therefor, said devices having parts to be sheared out therewith; comprising a base, a die on the base having first spaced shearing means, resiliently movable engaging means located adjacent said shearing means for engaging said parts, registration means for locating said supporting means with said parts extending across the first shearing means and said engaging means, rotatable means on the base, a shear punch carried on said rotatable means, aid punch having second spaced shearing means for engagement with said parts and shearing action thereof by angular movement of the second shearing means relative to said first shearing means when said rotatable means is rotated, said engaging means substantially following angular movement of the rotatable means while resiliently engaging said parts as they are sheared.

2. Apparatus according to claim 1, wherein the punch is removable from the rotatable means for sharpening or interchange, and including a removable and adjustable die nest for carrying the die and the engaging means on the base for die sharpening, interchange and adjustment thereof for shearing coaction with the punch upon punch or die interchange.

3. Apparatus for shearing electrical devices from supporting carriers therefor, said devices having leads to be sheared out therewith; comprising a base, a die on the base having first spaced shearing means, resiliently movable engaging means located adjacent said shearing means for engaging said leads, registration means for placing carriers of said devices with the leads of the devices extending across the first shearing means and the resiliently movable means, a lever pivoted to the base, a shear punch carried on said lever, said punch having second spaced shearing means for engagement with said leads and sequential shearing action thereof by angular movement of the second shearing means relative to said first shearing means when said lever is pivoted, said engaging means substantially following angular movement of the rotatable means while resiliently engaging said parts as they are sequentially sheared.

4. Apparatus for shearing electrical devices from supporting carriers therefor, said devices having conductive leads; comprising a base, a die on the base having first spaced shearing bars, resiliently movable pad means located adjacent said bars, registration means for placing carriers of said devices with the leads of the devices extending across said bars and the resilient pad means, a lever pivoted to the base, a shear punch carried on said lever, said punch having a second set of shearing bars for engagement with said conductive leads extending across the pad means and for sequential shearing action on the leads by angular movement of the second set of bars relative to said first set of bars when said lever is pivoted, said pad means substantially following said angular movement while resiliently supporting sheared lead portions.

5. Apparatus for shearing from supporting carriers electrical devices carried by the fixtures, said devices having delicate conductive leads by which they are carried; comprising a base, a die support on the base, a die carried by said support and having first spaced shearing bars, resiliently mounted pad means located between said bars, registration means for placing carriers of said devices with the leads of the devices extending across the bars and pad means, a lever pivoted to the base, a shear punch carried on said lever, said shear punch having a second set of shearing bars for engagement with said conductive leads on the pad means and angular shearing action thereon by angular movements relative to and between said first shearing bars.

6. A shearing device comprising a base, first and second pivoted arms, the first arm being adjacent the base, a third pivoted arm between said first and second arms, a die carried on the base, a shearing punch carried on the first arm for cooperation with the die when the arms are pivoted to shear out part of an object, an ejection device carried on the first arm at the shearing punch, slide means on the third arm carrying a drive member, said slide means having a normal position wherein the drive member is in registry with the ejection device, said second arm being movable relatively to the third arm to move the drive member into driving engagement with the ejection device to drive a sheared-out part of an object from the punch, latch means between the slide means on the second arm and the second arm to lock them together when the slide means is in a position wherein said drive member is out of registry with the ejection device, and means operative between the base and said slide means to drive the slide means to the last-named position when all the arms are rotated toward the base and thereby force the punch and die into cooperation.

7. A device according to claim 6, including magnetic means associated with the punch for retracting from the die a sheared-out part of an object prior to its ejection from the punch.

8. A shearing device comprising a base, first and second pivoted arms, the first arm being adjacent the base, a third pivoted arm between said first and second arms, a die carried on the base, a shearing punch carried on the first arm for cooperation with the die, magnetic means to hold sheared articles to the shearing punch after shearing, an ejection device carried on the first arm at the shearing punch, slide means on the third arm carrying a drive member, said slide means having a normal position wherein the drive member is in registry with the ejection device, said second arm being movable relatively to the third arm to move the drive member into driving engagement with the ejection device to remove a sheared object from the shear punch against the holding action of the magnet, latch means between the slide means and the second arm to lock them together when the slide means is in a position wherein said drive member is out of registry with the ejection device, and camming means operative between the base and said slide means adapted to drive the slide means to the last-named position when all the arms are rotated toward the base.

9. A shearing device comprising a base, a die supported on the base, a punch-supporting lever pivoted with respect to the base, a punch on said lever for shearing engagement with said die, a magnet associated with said punch for attracting sheared articles from the die, a movable ejection pin associated with the punch for stripping the article from the punch, a slide-supporting lever pivoted with respect to the base, a slider on said slide-supporting lever, a drive pin in the slider, means biasing the slider to a normal position wherein the drive pin is coaxial with said ejection pin, a driving lever pivoted with respect to the base for driving said drive pin against the ejection pin for moving it to ejecting position when the punch-supporting and slide-supporting members are moved together, a cam and a bolt on the slider, said driving lever having an opening for reception of the bolt for locking the driving and slide-supporting levers, said base having means engageable with said cam to drive the bolt into said opening to effect said locking when all of the levers are swung toward the base.

10. A shearing device according to claim 9, including detent means between the slide-supporting and punch-supporting levers.

11. A shearing device according to claim 9, including means biasing the ejection pin in nonejecting position and to hold the magnet in place on the punch-supporting lever independently of the punch, said punch being removable from its supporting lever.

12. A shearing device according to claim 9, including a removable and adjustable die nest for carrying the die on the base.

13. A shearing device comprising a base, an adjustable die nest on the base, a die frame in said nest forming a first pair of cutting bars, a movable pressure pad in the nest within the frame, spring means biasing said pad to a limiting position within the frame, a swingable lever on the frame, a punch on said lever, said punch having a second pair of cutting bars swingable to and from a pressure relation to said pad and into shearing relation between said cutting bars of the die.

14. A shearing device according to claim 13, wherein said die frame is composed of separable L-shaped members each carrying one of said second cutting bars.

15. A shearing device comprising a base, an adjustable die nest on the base, a die frame in said nest forming a pair of cutting bars, a movable pressure pad in the nest within the frame, spring means biasing said pad to a limiting position within the frame, a swingable lever on the frame, a punch on said lever, said punch having a pair of cutting bars swingable to and from said pad and into shearing relation between said cutting bars of the die, said punch being removable from the lever and having an opening extending therethrough between the bars thereon, a magnet in said opening, an ejection pin passing through an opening in the magnet and having a head thereon at one end to retain the magnet with respect to the lever when the punch is removed from the lever, said ejection pin also extending through an opening in the lever and having a second head at its opposite end, and a spring reacting between said second head and the lever to normally hold the first head against the magnet.

16. A shearing device according to claim 15, including another lever pivoted with respect to the base and a resiliently mounted drive pin on said other lever for driving engagement with said ejection pin and an additional lever pivoted with respect to the base engageable with said drive pin to drive it into operative engagement with said ejection pin.

17. A shearing device comprising a base, a first shearing device on the base, first and second operative assemblies pivoted with respect to the base for relative swinging movements, the first assembly carrying a second shearing device, movable stripping means associated with the second shearing device, a movable member on the first assembly, a drive means on said movable member so located that in one position of the movable member the drive means can drive the stripping means to strip a sheared part, said second assembly upon relative movement relative to the first assembly being engageable with said drive means to force it to drive the stripping means to strip when said movable member is in said one position, means for locking the assemblies together to prevent relative movements therebetween when said movable member assumes a second position, and means on the base engageable with said movable member to drive it from its first to said second position when both assemblies are swung toward the base to engage the shearing devices for shearing without driving the stripping means to strip.

18. A shearing device comprising a base, a first shearing device on the base, first and second lever assemblies pivoted with respect to the base, the first assembly carrying a second shearing device, a movable stripping pin associated with the second shear member, a movable slide member on the first assembly, a drive pin on said slide member so located that in one position of the slide member it can drive the stripping pin to strip a sheared part, means biasing the slide member to said one position, said second assembly upon relative movement relative to the first assembly being engageable with said drive pin to force it to drive the stripping pin to strip when said movable member is in said one position, means for locking the assemblies together to prevent relative movements therebetween when said movable member assumes a second position, and means on the base engageable with said slide member to drive it from its first to its second interlocking position when both assemblies are swung toward the base to engage the shearing devices without driving the stripping pin to strip.

19. A shearing device comprising a base, a die on the base, first and second lever assemblies pivoted with respect to the base, the first lever assembly carrying a punch, a magnet associated with the punch for attracting sheared parts, a movable stripping pin associated with the punch for stripping sheared parts from the magnet, a slider on the first assembly, a drive pin on said slider so located that in one position of the slider the pin can drive the stripping pin to strip a sheared part, means biasing the slide member to said one position, said second lever assembly upon relative movement relative to the first lever assembly being engageable with said drive pin to force it to drive the stripping pin to strip when said slider is in one position, latch means for locking the assemblies together to prevent relative movements therebetween when said slider assumes a second position, and pin means on the base engageable with a cam-forming portion of said slider to drive it from its first to its second position wherein the latch means interlocks the lever assemblies so that they may be swung together toward the base to engage the punch and die without driving the stripping pin to strip.

20. A shearing device according to claim 19, including detent means between the first lever assembly and the base for holding both lever assemblies at a substantial angle to the base for conveniently operating lever assemblies to move relatively for stripping operation after punching.

References Cited by the Examiner
UNITED STATES PATENTS 2,580,756  1/1952  Furman _____ 83—221

WILLIAM W. DYER, JR., *Primary Examiner.*

L. B. TAYLOR, *Assistant Examiner.*